Jan. 30, 1962     J. D. HAYES     3,018,688
PROJECTION OPTICAL SYSTEM
Filed March 28, 1960

| E.F.L. = 100 mm. B.F. = 60.61 mm. F.A. = 35°    REL. APERT. = f/2.5 ||||||
|---|---|---|---|---|---|
| LENS | CURVATURES | THICKNESSES | SPACINGS | $n_D$ | $v$ |
| A | $R_1 = 45.62$ <br> $R_2 = -272.37$ | $t_1 = 8.26$ | $S_1 = 0.47$ | 1.5170 | 64.5 |
| B | $R_3 = 29.86$ <br> $R_4 = 37.94$ | $t_2 = 7.32$ | $S_2 = 6.22$ | 1.5410 | 59.9 |
| C | $R_5 = -239.42$ <br> $R_6 = 26.74$ | $t_3 = 1.85$ | $S_3 = 26.96$ | 1.6490 | 33.8 |
| D | $R_7 = 97.08$ <br> $R_8 = -59.96$ | $t_4 = 6.69$ | | 1.5410 | 59.9 |

ALL LENSES FORMED FROM GAMMA RADIATION RESISTANT GLASS

INVENTOR.
JOHN D. HAYES
BY Frank C. Parker
ATTORNEY

United States Patent Office 3,018,688
Patented Jan. 30, 1962

3,018,688
PROJECTION OPTICAL SYSTEM
John D. Hayes, Rochester, N.Y., assignor to Bausch & Lomb Incorporated, a corporation of New York
Filed Mar. 28, 1960, Ser. No. 17,942
3 Claims. (Cl. 88—57)

This invention relates to optical systems and more particularly relates to projection objectives used in television cameras and kindred optical devices, said cameras being operated in areas of intense gamma radiation.

Optical systems of the kind mentioned above are peculiarly useful in nuclear development programs as an essential component of remotely operated television cameras which are located in areas of intense gamma radiation to observe or record the activity of physical objects or particles in said areas.

In situations where the gamma radiation field reaches the order of about $10^5$ roentgens, the lens members of said optical systems when made of the usual optical glasses become discolored to such an extent that these members become virtually useless as either lenses or windows. All types of ordinary optical glass exhibit discoloration in various shades of brown so that special cerium bearing glasses have recently been made available to overcome this problem.

Extensive calculation and development has been done in the present invention for the purpose of utilizing "non-browning" cerium bearing glasses in a projection objective having enduring good light transmitting qualities and high grade imaging properties.

It is an object of this invention to provide a novel projection objective or the like which withstands intense gamma radiation without resulting in discoloration of the optical materials contained therein, said objective being well corrected for producing an image of superior quality.

Further objects and advantages reside in the details of construction described in the specification herebelow which will be best understood by reference to the accompanying drawing, wherein.

Figures 1, 2:
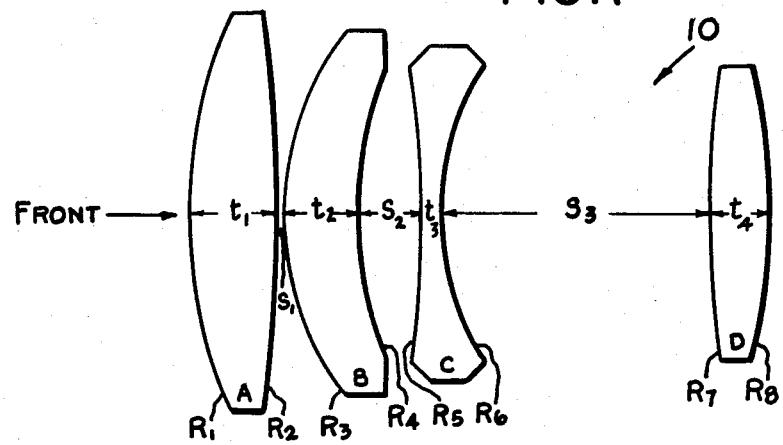
FIG. 1 is an optical diagram of an optical system embodying my invention.
FIG. 2 is a table of constructional data related to one successful form of a projection objective according to my invention.

Such a projection objective of preferred form, which is especially suited to the longer focal lengths, is shown generally by the numeral 10 in FIG. 1 of the drawing comprising a biconvex single lens A having positive power and having its refractive surface of strongest curvature facing the front or object side of the objective. Located closely to the rear side of lens A is a single meniscus lens B having positive power and having its convex side facing toward the front. Immediately rearwardly of lens B is located a biconcave single lens C of negative power having its surface of strongest curvature facing rearwardly adjacent to a wide diaphragm space $S_3$. Situated rearmost is a biconvex single lens D of positive power, lens D being optically aligned on a common axis with all of the other lenses and having its surface of strongest curvature facing rearwardly.

The projection objective 10 so constituted works at finite conjugates to project a well corrected image of an object at an image plane, not shown. All of said lenses are made from cerium bearing glasses which do not discolor upon exposure to intense gamma radiation.

According to this invention, careful computation and investigation of lens elements using the limited variety of cerium bearing non-browning optical glasses now available have disclosed that the refractive index ($n_D$) and Abbe number ($\nu$) of the respective lens elements should bear a relationship to each other as stated herebelow:

$$n_D(B) - n_D(A) = .024$$

$$n_D(C) - \frac{n_D(A) + n_D(B)}{2} = .120$$

$$n_D(D) = n_D(B)$$
$$\nu(A) - \nu(B) = 4.6$$
$$\nu(B) - \nu(C) = 26.1$$
$$\nu(D) = \nu(B)$$

Furthermore, it has been determined that the values of radii of curvature $R_1$ to $R_8$ of the refractive surfaces of the respective lens members, the axial thicknesses $t_1$ to $t_4$ of the respective lens members A, B, C and D and the lengths of the air spaces $S_1$, $S_2$ and $S_3$ should be according to the statement of inequalities given herebelow:

$$.434F < R_1 < .478F$$
$$2.58F < -R_2 < 2.86F$$
$$.284F < R_3 < .314F$$
$$.361F < R_4 < .397F$$
$$2.27F < -R_5 < 2.51F$$
$$.254F < R_6 < .281F$$
$$.923F < R_7 < 1.02F$$
$$.569F < -R_8 < .629F$$
$$.078F < t_1 < .086F$$
$$.070F < t_2 < .077F$$
$$.016F < t_3 < .020F$$
$$.063F < t_4 < .070F$$
$$.004F < S_1 < .005F$$
$$.056F < S_2 < .068F$$
$$.243F < S_3 < .295F$$

wherein F represents the equivalent focus of the objective.

A typical successful example of a projection objective of 100 mm. focal length constructed with special cerium bearing optical glasses according to this invention is given in the following table of constructional data, the field coverage being substantially 35°.

[E.F.L.=100 mm.  B.F.=60.61 mm.  Rel. Apert.=f/2.5]

| Lens | Curvatures | Thicknesses | Spacings | $n_D$ | $\nu$ |
|---|---|---|---|---|---|
| A | $R_1$= 45.62<br>$R_2$=−272.37 | $t_1$=8.26 | $S_1$=.047 | 1.517 | 64.5 |
| B | $R_3$= 29.86<br>$R_4$= 37.94 | $t_2$=7.32 | $S_2$=6.22 | 1.541 | 59.9 |
| C | $R_5$=−239.42<br>$R_6$= 26.74 | $t_3$=1.85 | $S_3$=26.96 | 1.649 | 33.8 |
| D | $R_7$= 97.08<br>$R_8$=−59.96 | $t_4$=6.69 |  | 1.541 | 59.9 |

It is submitted that there is here provided a novel projection objective which is conceived and constructed for the specific purpose of providing non-browning properties in such objectives when used in regions of intense gamma radiation, all of which is in accord with the stated objects of this invention.

Although only a single form of my invention has been shown and described in detail, other forms are possible and changes may be made in the specific constructional data therein without departing from the spirit of this invention as described in the claims here appended.

I claim:
1. A projection objective and the like having a relative aperture as great as $f/2.5$ and working at finite conjugates, said objective forming an image of an object upon a suitable receptive device, said objective comprising four optically aligned single lens members formed from cerium bearing glasses which are resistant to coloration effects when exposed to gamma radiation, said members being identified in their positional order from the front or entrant side of said objective as a positive double concave lens, a positive meniscus lens which is convex toward the front, a double concave negative lens, and a double convex positive lens, said objective being constructed according to the constructional data given in the statements of inequalities herebelow:

$$.434F < R_1 < .478F$$
$$2.58F < -R_2 < 2.86F$$
$$.284F < R_3 < .314F$$
$$.361F < R_4 < .397F$$
$$2.27F < -R_5 < 2.51F$$
$$.254F < R_6 < .281F$$
$$.923F < R_7 < 1.02F$$
$$.569F < -R_8 < .629F$$
$$.078F < t_1 < .086F$$
$$.070F < t_2 < .077F$$
$$.016F < t_3 < .020F$$
$$.063F < t_4 < .070F$$
$$.004F < S_1 < .005F$$
$$.056F < S_2 < .068F$$
$$.243F < S_3 < .295F$$

wherein $R_1$ to $R_8$ designate the radius of curvature of the lens surfaces, named in order from the front of the objective rearwardly, $t_1$ to $t_4$ designate the axial thicknesses of the lens members A to D respectively, $S_1$ to $S_3$ designate the air spaces between said respective lens members A to D, and F represents the equivalent focus of said objective.

2. A projection objective according to claim 1 constructed from non-browning cerium bearing glasses having the respective refractive indices ($n_D$) and Abbe numbers ($\nu$) as given herebelow:

$$n_D(B) - n_D(A) = .024$$
$$n_D(C) - \frac{n_D(A) + n_D(B)}{2} = .120$$
$$n_D(D) = n_D(B)$$
$$\nu(A) - \nu(B) = 4.6$$
$$\nu(B) - \nu(C) = 26.1$$
$$\nu(D) = \nu(B)$$

3. A projection objective and the like having a relative aperture as great as $f/2.5$ and working at finite conjugates, said objective forming an image of an object upon a suitable receptive device, said objective being composed of four optically aligned single lens members formed from cerium bearing glasses which are resistant to coloration effects when exposed to gamma radiation, said members being identified in their positional order from the front or entrant side of said objective as a positive double convex lens, a positive meniscus lens which is convex toward the front, a double concave negative lens, and a double convex positive lens, said objective being constructed according to the constructional data given in the table herebelow:

[E.F.L.=100 mm.  B.F.=60.61 mm.  Rel. Apert.=$f/2.5$]

| Lens | Curvatures | Thicknesses | Spacings | $n_D$ | $\nu$ |
|---|---|---|---|---|---|
| A | $R_1$= 45.62<br>$R_2$=−272.37 | $t_1$=8.26 | $S_1$=.047 | 1.517 | 64.5 |
| B | $R_3$= 29.86<br>$R_4$= 37.94 | $t_2$=7.32 | $S_2$=6.22 | 1.541 | 59.9 |
| C | $R_5$=−239.42<br>$R_6$= 26.74 | $t_3$=1.85 | $S_3$=26.96 | 1.649 | 33.8 |
| D | $R_7$= 97.08<br>$R_8$=−59.96 | $t_4$=6.69 |  | 1.541 | 59.9 | wherein $R_1$ to $R_8$ designate the radius of curvature of the lens surfaces, named in order from the front of the objective rearwardly, $t_1$ to $t_4$ designate the axial thicknesses of the lens members A to D respectively, $S_1$ to $S_3$ designate the air spaces between said respective lens members A to D, F represents the equivalent focus of said objective, and $n_D$ and $\nu$ represent the refractive index and the Abbe number respectively for the optical material of said lens members.

No references cited.